United States Patent

[11] 3,621,037

[72] Inventors Daniel Farge
Thiais;
Claude Moutonnier, Paris; Mayer Naoum Messer, Bievres, all of France
[21] Appl. No. 38,595
[22] Filed May 18, 1970
[45] Patented Nov. 16, 1971
[73] Assignee Rhone-Poulenc SA
Paris, France
[32] Priority May 19, 1969
[33] France
[31] 6916092

[54] BENZOFURAN DERIVATIVES
3 Claims, No Drawings
[52] U.S. Cl. ............................................ 260/343.3,
260/346.2 R, 260/465 D, 260/473 G, 260/517,
260/520, 260/591, 424/279
[51] Int. Cl. ............................................ C07d 5/40
[50] Field of Search ............................................ 260/343.3

[56] References Cited
UNITED STATES PATENTS
3,103,515  9/1963  Zaugg et al. .................. 260/343.3

*Primary Examiner*—Nicholas S. Rizzo
*Assistant Examiner*—Anne Marie T. Tighe
*Attorney*—Stevens, Davis, Miller & Mosher ABSTRACT: The new benzofuran derivatives of the formula:

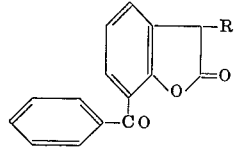

in which R represents hydrogen or an alkyl radical containing 1 through 4 carbon atoms, optionally carrying at least one halogen atom, possess pharmacodynamic properties making them useful as antiinflammatory agents.

BENZOFURAN DERIVATIVES

This invention relates to new therapeutically useful benzofuran derivatives, to a process for their preparation and to pharmaceutical compositions containing them.

The new benzofuran derivatives of the present invention are those of the general formula:

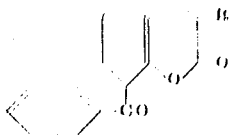

I in which R represents a hydrogen atom, or an alkyl radical containing 1 to 4 carbon atoms, optionally carrying at least one halogen atom.

The benzofuran derivatives of general formula I possess useful pharmacodynamic properties. They are particularly useful as anti-inflammatory agents. When orally administered, they exhibit an anti-inflammatory activity in the guinea pig at doses between 0.5 and 10 mg./kg. animal body weight and in the rat at doses between 0.5 and 15 mg./kg. animal body weight. When intravenously administered, they exhibit an antibradykinin activity in the guinea pig at doses between 0.015 and 1 mg./kg. animal body weight. In human therapy, the benzofuran derivatives are particularly useful in the treatment of arthritis, chronic inflammatory rheumatisms, abarticular rheumatisms, neuromuscular algias and gout. They can also be used in phlebology and in traumatology.

According to a feature of the invention, the benzofuran derivatives of general formula I are prepared by cyclization of a 2-hydroxyphenylacetic acid derivative of the general formula:

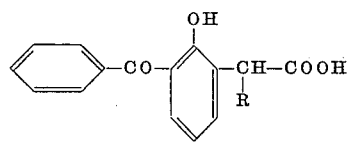

II in which R is as hereinbefore defined, by methods known per se for the cyclization of 2-hydroxyphenylacetic acids to benzofuran compounds. In this specification the term "-methods known per se" means methods heretofore used or described in the chemical literature. Generally the cyclization is effected by heating the acid of general formula II in acetic anhydride in the presence of sulfuric acid at a temperature between 40 and 100 C.

Acids of general formula II can be obtained by demethylation of a 2-methoxyphenylacetic acid derivative of the general formula:

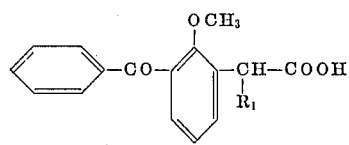

III in which $R_1$ represents an alkyl radical containing 1 to 4 carbon atoms, optionally carrying at least one halogen atom, by heating in an aqueous acid medium.

The acids of general formula III can in turn be obtained by oxidation of a 2-methoxyphenylacetic acid derivative of the general formula:

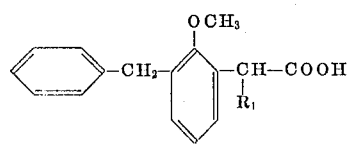

IV in which $R_1$ is as hereinbefore defined, by methods known per se for oxidation of a methylene group to a carbonyl group, whilst the acids of general formula IV can themselves be obtained by hydrolysis of benzofuran derivatives of the general formula:

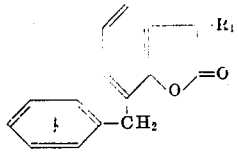

V in which $R_1$ is as hereinbefore defined, for example by heating a compound of general formula V in an alkaline medium, and then treating the product with a methylating agent to convert the hydroxy group in the resulting 2-hydroxyphenylalkanoic acid into a methoxy group.

Benzofuran derivatives of general formula V can be obtained by methods known per se for converting a 7-benzyl-benzofuran-2-carboxylic acid of the general formula:

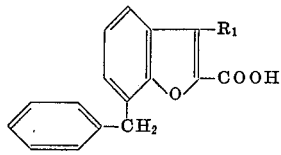

VI in which $R_1$ is as hereinbefore defined, into a lactone of general formula V. Thus, an acid of general formula VI can be converted via its halide into an azide of the general formula:

VII in which $R_1$ is as hereinbefore defined, for example by reaction with sodium azide at a temperature of about 10° C. The azide of general formula VII can then be converted into a carbamate of the general formula:

VIII in which -benzoyl-1 is as hereinbefore defined, and $R_2$ represents an alkyl radical containing 1 to 4 carbon atoms, by heating in an alcohol of the general formula $R_2$—OH, and the carbamate of general formula VIII can be converted into a lactone of general formula V by heating in a concentrated inorganic acid.

The acids of general formula VI can be obtained by saponification of a corresponding ester by conventional methods for the saponification of esters.

Esters of the general formula:

IX in which $R_1$ is as hereinbefore defined and $R_3$ represents an alkyl radical containing 1 to 4 carbon atoms can be obtained by cyclization of a compound of the general formula:

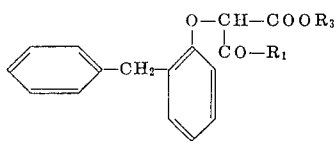

X in which R and R are as hereinbefore defined, for example by heating in polyphosphoric acid to a temperature of about 100° C.

The compounds of general formula X can be obtained by reaction of 2-hydroxydiphenylmethane with a halogenated β-ketoester of the general formula $R_1—CO—CHCl—COOR_3$, in which $R_1$ and $R_3$ are as hereinbefore defined.

2-Methoxyphenylacetic acid derivatives of general formula III in which $R_1$ represents an alkyl radical containing 1 to 4 carbon atoms can be prepared from derivatives of 3-benzoyl-2-methoxyphenylacetic acid of the general formula:

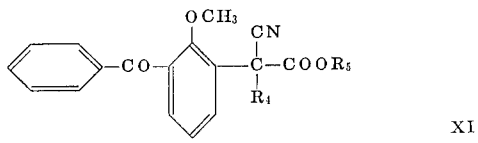

XI in which $R_4$ and $R_5$ are the same or different and each represents an alkyl radical containing 1 to 4 carbon atoms, by methods known per se for hydrolysis and decarboxylation of esters of cyanoacetic acid.

The derivatives of 3-benzoyl-2-methoxyphenylacetic acid of general formula XI can be obtained by alkylation of a 3-benzoyl-2-methoxyphenylacetic ester of the general formula:

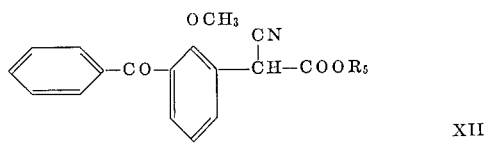

XII in which $R_5$ is as hereinbefore defined, by reaction with a compound of the general formula $R_4—Y$, in which $R_4$ is as hereinbefore defined and Y represents the acid residue of a reactive ester, for example a halogen atom, in the presence of an alkaline condensation agent such as sodium or potassium ethoxide.

3-Benzoyl-2-methoxyphenylacetic esters of general formula XII can be obtained from 3-benzoyl-2-methoxyphenylacetonitrile of the formula:

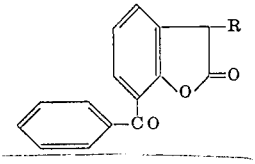

by methods known per se for the carbalkoxylation of nitriles containing an active hydrogen atom, preferably by reaction with an alkyl carbonate of the general formula $R_5—O—CO—O—R_5$, in which $R_5$ is as hereinbefore defined, in the presence of an alkaline condensation agent such as sodium ethoxide or sodamide.

3-Benzoyl-2-methoxyphenylacetonitrile can be obtained from the 3-halomethyl-2-methoxybenzophenones of the general formula:

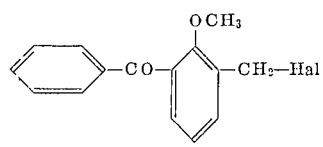

XIV in which Hal represents a halogen (preferably bromine) atom, by conventional methods for converting a halogenated derivative into the corresponding nitrile.

The 3-halomethyl-2-methoxybenzophenones of general formula XIV can be obtained from 2-methoxy-3-methylbenzophenone by conventional methods for the halogenation of alkyl side chains of aromatic derivatives.

When in general formula II the symbol R represents a hydrogen atom, the acid (i.e., 3-benzoyl-2-hydroxyphenylacetic acid) can be obtained from 3-benzoyl-2-methoxyphenylacetonitrile by known methods for converting a nitrile to the corresponding acid and a methoxy radical to a hydroxyl radical. It is advantageous to heat the nitrile in water or in an organic solvent, for example ethanol, in the presence of a base, for example sodium hydroxide or potassium hydroxide, or of an acid, for example sulfuric acid.

The foregoing examples illustrate the invention.

EXAMPLE 1

Concentrated sulfuric acid (2 drops) is added to a suspension of 3-benzoyl-2-hydroxyphenylacetic acid (17.9 g.) in acetic anhydride (14.3 g.) and the mixture is heated for 10 minutes at between 50° and 60° C. The 3-benzoyl-2-hydroxyphenylacetic acid dissolves and a product is then precipitated. The mixture is poured into water (200 cc.) and stirred for 30 minutes. The crystals are filtered off and washed with water (450 cc.) and a product (16 g.) melting at 125° C. is obtained, which is purified by recrystallization from ethanol (195 cc.). 2-Oxo-7-benzoyl 2,3-dihydrobenzofuran (14.2 g.), melting at 131° C., is thus obtained.

3-Benoyl-2-hydroxyphenylacetic acid employed as starting material can be prepared as follows:

A mixture of (3-benzoyl-2-methoxyphenyl)-acetonitrile (198 g.), concentrated sulfuric acid (600 cc.) and water (600 cc.) is heated under reflux for 1 hour. Water (1.5 liters) is added and the mixture is extracted with diethyl ether (2 liters). The ethereal solution is extracted with 4N sodium hydroxide solution (1.5 liters) and the alkaline solution is treated with decolorizing charcoal (50 g.) and then acidified with 11N hydrochloric acid. An oil separates out, which is extracted with methylene chloride (2 liters). The extract is dried over anhydrous sodium sulfate and concentrated to dryness under reduced pressure (20 mm.Hg). A yellow oil (107 g.) is thus obtained, which is a mixture of 3-benzoyl-2-hydroxyphenylacetic acid and of 3-benoyl-2-methoxyphenylacetic acid. This mixture (20 g.) is heated for 2 hours under reflux with 48 percent (w/v) aqueous hydrobromic acid (200 cc.) in acetic acid (200 cc.). The mixture is concentrated to dryness under reduced pressure (20 mm.Hg) and water (300 cc.) is then added. A product crystallizes and is filtered off and washed with water (300 cc.). The product (17 g.) is recrystallized from benzene (110 cc.) to yield 3-benzoyl-2-hydroxyphenylacetic acid (13.5 g.), m.p. 154° C.

(3-Benzoyl-2-methoxyphenyl)acetonitrile is prepared as follows:

3-Bromomethyl-2-methoxybenzophenone (509 g.) is dissolved in dioxan (1 liter) and a solution of sodium cyanide (246 g.) in water (1 liter) is added. The mixture is heated under reflux for 2 hours 30 minutes and extracted with diethyl ether (2.5 liters). The ethereal solution is dried over anhydrous sodium sulfate and concentrated to dryness under reduced pressure (20 mm.Hg) to give a brown oil (410 g.), which is purified by distillation under reduced pressure to yield (2-methoxy-3-benzoylphenyl)-acetonitrile (198 g.), b.p. 197° C./0.5 mm.Hg.

3-Bromomethyl-2-methoxybenzophenone is prepared as follows:

2-Methoxy-3-methylbenzophenone (377 g.) is dissolved in ethylene bromide (1 liter). The mixture is heated under reflux and bromine (267 g.) is run in over the course of 1¼ hours in the presence of ultraviolet light. Heating under reflux is continued for 30 minutes and the product is concentrated to dryness under reduced pressure (20 mm.Hg) to give a quantitative yield of 3-bromomethyl-2-methoxybenzophenone, which is used without further purification.

2-Methoxy-3-methylbenzophenone can be prepared according to H. Richtzenhain and P. Nippus, Ber., 82, 408, (1949).

EXAMPLE 2

Concentrated sulfuric acid (5 cc.) is added to a suspension of 2-(3-benzoyl-2-hydroxyphenyl)propionic acid (38 g.) in acetic anhydride (250 cc.). The resulting solution is heated at 50° C. for 10 minutes and poured into ice water (1.5 liters) with stirring; an oil separates and crystallizes. The crystals are filtered off and washed with water (750 cc.) and a product (33.4 g.), melting at 70° C., is obtained which is dissolved in methylene chloride (300 cc.) and chromatographed on silica (300 g.). Elution is effected with methylene chloride (3 liters). The solvent is evaporated under reduced pressure (20 mm.Hg) leaving a crystalline residue (27.6 g.). This product (21.6 g.) is purified by recrystallization from a mixture of diethyl ether (120 cc.) and diisopropyl ether (200 cc.) yielding 2-oxo-3-methyl-7-benzoyl-2,3-dihydrobenzofuran (13.1 g.) melting at 74° C.

2-(3-Benzoyl-2-hydroxyphenyl)propionic acid can be prepared as follows:

A mixture of 2-(3-benzoyl-2-methoxyphenyl)-propionic acid (19.4 g.), 48 percent (w/v) aqueous hydrobromic acid (190 cc.) and acetic acid (190 cc.) is heated under reflux for 17 hours and then concentrated to dryness under reduced pressure (20 mm.Hg). Methanol (100 cc.) and 4N sodium hydroxide solution (100 cc.) are added and the mixture is heated under reflux for 1 hour and then concentrated to dryness under reduced pressure (20 mm.Hg). Water (250 cc.) is added, and the alkaline solution is treated with decolorizing charcoal (3 g.) and then acidified to pH=1 by addition of 12N hydrochloric acid; an oil separates which is extracted with diisopropyl ether (900 cc.). The ethereal solution is washed with water (100 cc.), dried over anhydrous sodium sulfate, treated with decolorizing charcoal (3 g.) and concentrated to dryness under reduced pressure (20 mm.Hg). The yellow oil (16.8 g.) obtained is purified by crystallization from a mixture of diisopropyl ether (60 cc.) and petroleum ether (boiling point=40°–65° C., 90 cc) yielding 2-(3-benzoyl-2-hydroxyphenyl)propionic acid (13 g.) melting at 102° C.

2-(3-Benoyl-2-methoxyphenyl)propionic acid is prepared as follows:

2-(3-Benzyl-2-methoxyphenyl)propionic acid (19.5 g.) is dissolved in N/10 aqueous sodium hydroxide (722 cc.); water (1 liter) is added and a solution of potassium permanganate (45.6 g.) in water (1.9 liters) is run in over the course of 10 minutes. The reaction mixture is stirred for 16 hours at 20° C. and acidified by addition of 4.5N sulfuric acid (200 cc.); sodium metabisulfite (50 g.) is then added. The mixture is extracted three times with methylene chloride (total 900 cc.) and the extract is dried over anhydrous sodium sulfate, treated with decolorizing charcoal (5 g.) and concentrated to dryness under reduced pressure (20 mm.Hg) to give 2-(3-benzoyl-2-methoxyphenyl)propionic acid (19.4 g.) melting at 124° C.

2-(3-Benzyl-2-methoxyphenyl)propionic acid is prepared as follows:

A mixture of 2-oxo-3-methyl-7benzyl-2,3-dihydrobenzofuran (18.1 g.), 4N sodium hydroxide solution (76 cc.) and water (225 cc.) is heated under reflux. Dimethyl sulfate (77 g.) and 4N aqueous sodium hydroxide (152 cc.) are simultaneously added over a period of 1 hour, during which the temperature of the reaction medium is maintained at between 50° and 80° C., and the mixture is then heated under reflux for 3 hours. The reaction mixture is cooled and then acidified by addition of 4N hydrochloric acid (300 cc.). The whole is extracted three times with diethyl ether (total 450 cc.) and the ethereal extracts are dried over anhydrous sodium sulfate, then treated with decolorizing charcoal (3 g.) and concentrated to dryness under reduced pressure (20 mm.Hg) to give 2-(3-benzyl-2-methoxyphenyl)propionic acid (19.5 g.) in the form of an oil.

2-Oxo-3-methyl-7-benzyl-2,3-dihydrobenzofuran is prepared as follows:

2-Ethoxycarbonylamino-3-methyl-7-benzylbenzofuran (63 g.) is heated under reflux in 12N hydrochloric acid (450 cc.) for 2 hours. The mixture is cooled and extracted three times with diethyl ether (total 1.5 liters). The ethereal solutions are dried over anhydrous sodium sulfate and the solution is then treated with decolorizing charcoal (3 g.). After filtration and concentration to dryness under reduced pressure (20 mm.Hg), a crystalline residue (52.8 g.) is obtained which is purified by recrystallization from cyclohexane (200 cc.) to give 2-oxo-3-methyl-7-benyl-2,3-dihydrobenzofuran (34 g.) melting at 93° C.

2-Ethoxycarbonylamino-3-methyl-7-benzylbenzofuran is prepared as follows:

A solution of 2-azidocarbonyl-3-methyl-7-benzylbenzofuran (48 g.) in ethanol (500 cc.) is heated under reflux for 2 hours. The mixture is concentrated to dryness under reduced pressure (20 mm.Hg) and 2-ethoxy-carbonylamino-3-methyl-7-benzylbenzofuran (52 g.); m.p. 116°–117° C., is obtained.

2-Azidocarbonyl-3-methyl-7-benzylbenzofuran is prepared as follows:

2-Chlorocarbonyl-3-methyl-7-benzylbenzofuran (51.4 g.) is dissolved in acetone (900 cc.). The resulting solution is added to a solution of sodium azide (13 g.) in water (480 cc.) over a period of 1 hour while the temperature of the reaction mixture is maintained at 10° C.; a product criptallizes. Water (2 liters) is added and the crystals are filtered off, washed with water (1 liter) and dried in air to yield 2-azidocarbonyl-3-methyl-7-benzylbenzofuran (48 g.) melting at 88° C.

2-Chlorocarbonyl-3-methyl-7-benzylbenzofuran is prepared as follows:

2-Carboxy-3-methyl-7-benzylbenzofuran (127.6 g.) and thionyl chloride (350 cc.) are heated under reflux for 3 hours, and then the mixture is concentrated to dryness under reduced pressure (20 mm.Hg). Benzene (200 cc.) is added and the mixture is again concentrated to dryness under reduced pressure (20 mm.Hg) to yield 2-chlorocarbonyl-3-methyl-7-benzylbenzofuran (125 g.) melting at 78° C.

2-Carboxy-3-methyl-7-benzylbenzofuran is prepared as follows:

A mixture of 2-ethoxycarbonyl-3-methyl-7-benzylbenzofuran (28.3 g.), ethanol (2 liters) and 10N aqueous sodium hydroxide (120 cc.) is heated for 3 hours under reflux. The mixture is concentrated to dryness under reduced pressure (30 mm.Hg), water (2 liters) is added and the whole is washed three times with diisopropyl ether (total 900 cc).

The aqueous alkaline solution is acidified by addition of concentrated hydrochloric acid ($d=1.19$; 200 cc.) and an oil separates out which is extracted with methylene chloride (2.1 liters). The methylene chloride extracts are dried over anhydrous sodium sulfate, treated with decolorizing charcoal (30 g.), filtered and concentrated to dryness under reduced pressure (20 mm.Hg). A crystalline residue (315 g.) is obtained, which is purified by recrystallization from acetonitrile (800 cc.) to yield 2-carboxy-3-methyl-7-benzylbenzofuran (102 g.) melting at 174° C. A further crop of 2-carboxy-3-methyl-7-benzylbenzofuran (45 g.), melting at 174° C., is obtained by concentrating the mother liquors to one third of their volume.

2-Ethoxycarbonyl-3-methyl-7-benzylbenzofuran is prepared as follows:

A mixture of ethyl α-(2-benzylphenoxy)acetyl acetate (360 g.) and polyphosphoric acid (3 kg.) is maintained at 100° C. for 2 hours with stirring. Afterwards it is poured into ice water (15 liters), extracted with diisopropyl ether (6 liters); and the organic solution is washed three times with water (total 2 liters), dried over anhydrous sodium sulfate, treated with decolorizing charcoal (50 g.), filtered and then concentrated to dryness under reduced pressure (20 mm.Hg) to yield 2- ethoxycarbonyl-3-methyl-7-benzlybenzofuran (298 g.) in the form of an oil.

Ethyl α-(2-benzylphenoxy)acetyl acetate is prepared as follows:

2-Hydroxydiphenylmethane (334 g.) is dissolved in dimethylformamide (2.5 liters) and sodium hydride impregnated with Bayol oil (containing 54 percent of hydride; 80.5 g.) is added under nitrogen over a period of one hour. The mixture is heated under reflux, ethyl α-chloroacetyl acetate (298 g.) is added and refluxing is continued for 1 ½ hours. The reaction mixture is concentrated to dryness under reduced pressure and a solution of concentrated sulfuric acid (200 cc.) in water (1.5 liters is added. The whole is extracted three times with methylene chloride (total 2.5 liters) and the extract is dried over anhydrous sodium sulfate. After filtering and concentrating to dryness under reduced pressure (20 mm.Hg), the brown oil (675 g.) obtained is dissolved in cyclohexane (600 cc.) and chromatographed on silica (2 kg.). Elution is effected with benzene and a fraction of 10 liters is collected and concentrated to dryness under reduced pressure. Ethyl α-(2-benzylphenoxy)acetyl (513 g.) is thus obtained in the form of an oil.

2-Hydroxydiphenylmethane is prepared according to Claisen, Ann. Chem., 442, 210 (1925).

Ethyl α-chloroacetyl acetate is prepared according to W.R. Boehme, Org. Synth., 33, 45 (1953).

The present invention includes within its scope pharmaceutical compositions containing, as active ingredient, at least one of the -benzofuran derivatives of general formula I in association with a pharmaceutical carrier or coating. The invention includes especially such preparations made up for oral, rectal or parenteral administration, or topical application, e.g., as ointments or creams.

Solid compositions for oral administration include tablets, pills, powders and granules. In such solid compositions the active compound is admixed with at least one inert diluent such as sucrose, lactose or starch. The compositions may also comprise, as is normal practice, additional substances other than inert diluents, for example lubricants such as magnesium stearate. Liquid compositions for oral administration include pharmaceutically acceptable emulsions, solutions, suspensions, syrups and elixirs containing inert diluents such as water and liquid paraffin. Besides inert diluents, such compositions may also comprise adjuvants, such as wetting, emulsifying and suspending agents, and sweetening, flavoring and aromatizing agents. The compositions according to the invention for oral administration also include capsules of absorbable material, such as gelatin, containing the active substance with or without the addition of diluents or excipients.

Preparations according to the invention for parenteral administration include sterile aqueous or nonaqueous solutions, suspensions or emulsions. Examples of nonaqueous solvents or vehicles are propylene glycol, polyethylene glycol, vegetable oils such as olive oil, and injectable organic esters, for example ethyl oleate. The compositions may also contain adjuvants such as wetting, emulsifying and dispersing agents. They may be sterilized, for example, by filtration through a bacteria-retaining filter, by incorporation in the compositions of sterilizing agents, by irradiation, or by heating. They may also be manufactured in the form of sterile solid compositions which can be dissolved in sterile water or some other sterile injectable medium immediately before use.

Compositions for rectal administration are suppositories which contain in addition to the active substance, excipients such as cacao butter or a suppository wax.

The percentage of active ingredient in the compositions of the invention may be varied, it being necessary that it should constitute a proportion such that a suitable dosage shall be obtained. The dosage depends on the desired therapeutic effect, on the method of administration and on the duration of the treatment. In human therapy, the compositions should be administered so as to give to an adult daily doses of between 100 and 1000 mg. of active substance.

The following example illustrates pharmaceutical compositions according to the invention.

EXAMPLE 3

Tablets weighing 200 mg. and having the following composition are prepared:

| | |
|---|---|
| 2-oxo-7-benzoyl-2,3-dihydrobenzofuran | 50 mg. |
| starch | 120 mg. |
| colloidal silica | 27 mg. |
| magnesium stearate | 3 mg. |

We claim:
1. A benzofuran derivative of the formula:

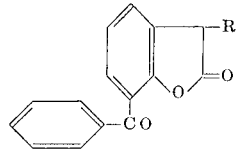

in which R represents hydrogen or alkyl of 1 through 4 carbon atoms.

2. 2-Oxo-7-benzoyl-2,3-dihydrobenzofuran.
3. 2-Oxo-3-methyl-7-benzoyl-2,3-dihydrobenzofuran.

* * * * *